Figure 1:
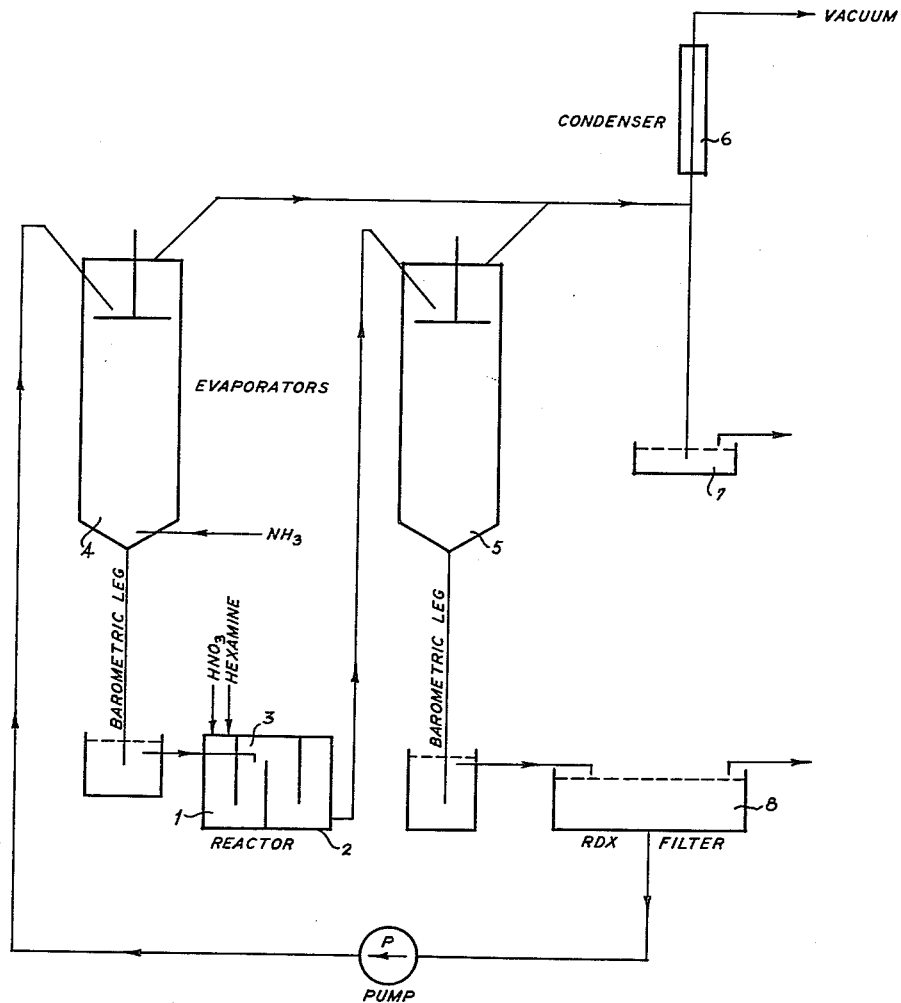

Aug. 14, 1962 J. A. RUTH 3,049,543
MANUFACTURE OF CYCLONITE
Filed June 18, 1958

INVENTOR.
JOHN A. RUTH
BY
ATTORNEYS:

United States Patent Office 3,049,543
Patented Aug. 14, 1962

3,049,543
MANUFACTURE OF CYCLONITE
John A. Ruth, Carterville, Ill., assignor to Olin Mathieson Chemical Corporation, East Alton, Ill., a corporation of Virginia
Filed June 18, 1958, Ser. No. 742,949
3 Claims. (Cl. 260—248)

This invention relates to explosives and more particularly to a novel process for the preparation of cyclotrimethylenetrinitramine.

Cyclotrimethylenetrinitramine, more commonly and hereinafter referred to as cyclonite, has been prepared by a number of processes and the most satisfactory process from all aspects involves the nitrolysis of hexamethylenetetramine with highly concentrated nitric acid. More recently, this process has been materially improved by incorporating ammonium nitrate into the nitric acid before reacting it with the hexamethylenetetramine. While such a process provides an increased yield of cyclonite, it also possesses some inherent disadvantages. In such a process, the removal of water from the system is time consuming and relatively expensive. Also, the ammonium nitrate introduced into the reaction is recovered from the system as a solid and is not returned to the reactor. In addition, such a process inherently involves losses of materials and energy heat which detract from the efficiency of the operation.

It is, therefore, an object of this invention to provide a cyclonite manufacturing process overcoming the disadvantages of the prior art. Another object of this invention is to provide a novel improved process for the manufacture of cyclonite. Still another object of this invention is to provide a cyclonite manufacturing process that is particularly well adapted to continuous operation. A more specific object of this invention is to provide an improved process for the preparation of cyclonite by the nitrolysis of hexamethylene tetramine in the presence of ammonium nitrate.

In accordance with this invention, generally stated, these and other objects are achieved by the nitrolysis of hexamethylene tetramine with concentrated nitric acid and adding molten ammonium nitrate to the reaction mixture. Molten ammonium nitrate is added to the reaction mixture and, after the reaction is complete, the excess over that consumed by chemical reaction is recovered by evaporation of the volatile components of the spent acid mixture and returned to the reactor. The ammonium nitrate in the system is replenished by neutralization of a portion of the spent nitric acid. The neutralization is executed concurrently with the last stage of the evaporation. Molten ammonium nitrate from the evaporator is introduced directly into the reactor in which the hexamethylenetetramine is nitrolysed.

The reaction of the concentrated nitric acid with hexamethylenetetramine can be carried out in any suitable equipment but is preferred to use a multi-compartment reactor to insure that the dwell time of the reaction mixture in the reaction apparatus will be sufficiently long for essentially complete conversion of the hexamethylenetetramine to cyclonite. When a reactor having a plurality of compartments is used, the concentrated nitric acid and hexamethylenetetramine are preferably added separately to the first compartment. The mixture is then allowed to flow through subsequent compartments in which the third principal reactant, ammonium nitrate, is present. The temperature of the reactor is not critical but it is preferred that that portion of the reactor containing only hexamethylenetetramine and nitric acid be maintained at a temperature not in excess of 30° C. Those portions of the reactor where ammonium nitrate is present are normally maintained at a higher temperature, preferably about 85° C.

The nitrolysis of hexamethylenetetramine is much more efficient when highly concentrated nitric acid is utilized. Also, more concentrated acid contains less water which must subsequently be removed. Thus, for economical operation of the process of this invention, the nitric acid must have a concentration of at least about 97.5%. It is preferred, however, to utilize acid containing about 99.5% nitric acid by weight.

The ratio of the materials entering into the reaction is not critical to the successful operation of the present process, but in order to obtain commercially feasible amounts of cyclonite, it is preferred to maintain the weight ratio of the acid to the hexamethylenetetramine between about 14:1 and about 21:1 and the weight ratio of the acid to the ammonium nitrate between about 2.2:1 and about 1.4:1. Optimum results are obtained by utilizing about 17.2 parts by weight of acid and about 9.6 parts by weight of ammonium nitrate for each part of hexamethylenetetramine.

Although the spent acid from the reaction can be neutralized immediately after removing the cyclonite therefrom, it is preferred to remove a portion of the nitric acid by distillation prior to neutralization. This permits more efficient operation and provides a ready means for controlling the ammonium nitrate balance. In actual practice, the reaction mixture is concentrated, cooled, filtered, and then further evaporated in the presence of gaseous ammonia.

Various types of evaporators can be used for the concentration of the spent acid, but it is generally preferred to use falling film evaporators. In order to avoid heating the reaction mixture containing cyclonite, ammonium nitrate, nitric acid and water to a temperature sufficiently high to evaporate a large portion of the nitric acid at atmospheric pressures, the evaporators are preferably operated under a reduced, i.e., sub-atmospheric, pressure. The evaporating apparatus is maintained at a sufficiently high temperature to effect evaporation at the particular pressure being employed. In those instances where a plurality of evaporators are in the system, the last evaporator into which gaseous ammonia is introduced to neutralize the remaining nitric acid is maintained at a temperature sufficiently high to liquify the ammonium nitrate.

The invention will be more fully understood by reference to the following preferred embodiment taken in connection with the drawing which illustrates a schematic flow diagram of the process of this invention. All proportions in this embodiment and throughout the specification are in parts by weight unless otherwise indicated.

In a continuous process for the manufacture of cyclonite, hexamethylenetetramine and 99.5% nitric acid were continuously fed into the first compartment 1 of reactor 2, about 1 part of hexamethylenetetramine being introduced for each 17 parts of nitric acid. This compartment of the reactor was maintained at a temperature slightly below 30° C. The material then flowed into the second compartment 3 of the reactor which was maintained at a temperature of about 85° C. The effluent from evaporator 4 consisting of about 99.4% molten ammonium nitrate together with about 0.6% cyclonite was then mixed with the nitric acid and the hexamethylenetetramine at the rate of about 9 parts of ammonium nitrate for each part of hexamethylenetetramine. The reactor contains numerous compartments and is preferably of a size in relation to through-put to give an effective dwell period of between 30 and 40 minutes. The effluent from the reactor containing approximately 7.5% cyclonite, about 56% nitric acid, about 1% formaldehyde, and about 28% ammonium nitrate, was then pumped to evaporator 5.

This falling film type evaporator was operated under an absolute pressure of about 24 inches of mercury and at an effluent temperature of about 85° C. The temperature of the evaporator was maintained by a suitable heating jacket which is not shown. In passing through the evaporator, approximately one-half of the nitric acid was evaporated from the reaction mixture. This nitric acid was drawn off the top of the evaporator, condensed in condenser 6 and recovered in vessel 7. The nitric acid thus recovered was then stabilized by means not forming a part of the present invention. The effluent from evaporator 5 contained about 11.2% cyclonite, about 42.2% nitric acid, about 0.8% formaldehyde, and about 42% ammonium nitrate. This mixture was cooled to room temperature and filtered as shown generally at 8 to remove the cyclonite. During this step, a portion of the ammonium nitrate was also precipitated. About 2.7 parts of filter cake were produced for each part of hexamethylenetetramine introduced into the reactor. This filter cake contained approximately 74% cyclonite, about 16.6% ammonium nitrate, about 9% nitric acid, and less than 1% water. The filter cake was washed with hot water to remove the ammonium nitrate and nitric acid. The washing liquid may be neutralized with ammonia and evaporated to dryness to recover the ammonium nitrate.

The filtrate, containing about 48% nitric acid, about 4% water, about 46.5% ammonium nitrate, about 1% formaldehyde, and about 0.3% cyclonite, was pumped to the second evaporator 4. This evaporator was also of the falling film type and was operated under a 24 inch vacuum at a temperature of about 170° C. A portion of the nitric acid was evaporated and drawn off as a distillate which was condensed in condenser 6 together with the distillate from the first evaporator 5. Gaseous ammonia was fed into evaporator 4 at the rate of about ⅓ part per minute. Thus, a portion of the nitric acid remaining in the filtrate was neutralized to form ammonium nitrate which, together with the ammonium nitrate originally in the filtrate, left the evaporator as an essentially anhydrous liquid. The molten effluent from evaporator 4, containing approximately 99.4% ammonium nitrate and about 0.6% cyclonite, was then introduced into compartment 3 of the reactor as shown.

As shown in the above embodiment, the effluent from the evaporator is carried through barometric legs for subsequent treatment. While such barometric legs are quite convenient for use with vacuum evaporators, it will be readily understood that the material can be removed from the evaporators by any other suitable means. When the evaporators are operated at atmospheric pressure, the effluent can be lead directly to subsequent operational steps rather than through a barometric leg.

The above embodiment illustrates a continuous process in which the concept of this invention can be used to best advantage. It will be readily appreciated that this process is equally adaptable to a batch operation. It is to be understood that the above embodiment is not limitative and that various modifications can be made therein without departing from the present invention. The proportions of the ingredients can be varied, the temperatures can deviate from those set forth above, and various types of apparatus can be utilized. In addition, sequence of steps can be modified to meet particular circumstances. Thus, the reactor effluent can be filtered before any concentration step and one evaporator can be employed rather than the two set forth in the above example. Alternately, additional evaporators or other apparatus can also be used.

Having thus described the invention, what is claimed is:

1. In a process for the preparation of cyclonite by mixing hexamine and nitric acid having a concentration of at least 97.5% at a temperature up to about 30° C., adding ammonium nitrate to the hexamine-acid mixture, permitting the temperature of the reaction mixture to rise to about 85° C., and removing the resultant cyclonite therefrom by distillation and filtration of the spent acid, the improvement comprising distilling the spent acid so as to precipitate substantially all of the resultant cyclonite therefrom, cooling and filtering the spent acid to remove the precipitated cyclonite, completing the distillation of the spent acid to remove substantially all of the water therefrom, the water removal being conducted in the presence of gaseous ammonia and at a temperature at least equivalent to the melting point of ammonium nitrate so as to form molten ammonium nitrate, and adding the molten ammonium nitrate thus obtained with any entrained cyclonite directly to a mixture of hexamine and nitric acid for the preparation of additional cyclonite.

2. In a process for the manufacture of cyclonite by mixing ammonium nitrate, hexamine and concentrated nitric acid, and removing the resultant cyclonite from the spent acid mixture by stepwise distillation and filtration of the spent acid, the improvement comprising executing the final distillation of the spent acid in the presence of gaseous ammonia and at a temperature at least equivalent to the melting point of ammonium nitrate so as to form molten ammonium nitrate and adding the molten ammonium nitrate thus obtained together with any entrained cyclonite directly to a reaction mixture of hexamine and nitric acid for the preparation of additional cyclonite.

3. The process of claim 2 in which the weight ratio of the concentrated nitric acid to ammonium nitrate is between about 1.4:1.0 and about 2.2:1.0.

References Cited in the file of this patent

UNITED STATES PATENTS

| 2,395,773 | Wyler | Feb. 26, 1946 |
| 2,398,080 | Caesar et al. | Apr. 9, 1946 |

FOREIGN PATENTS

| 946,496 | Germany | May 23, 1957 |
| 1,016,268 | Germany | Sept. 26, 1957 |

OTHER REFERENCES

Chemical Abstracts, vol. 45, columns 10585–6 (1951). [Abstract of Williams et al., Can. J. Chem., vol. 29, pages 642–5 (1951).]

Chemical Abstracts, vol. 49, column 8601 (1955). [Abstract of Bonnet, Chemie et Industrie, vol. 72, pages 1185–8 (1954).]